UNITED STATES PATENT OFFICE.

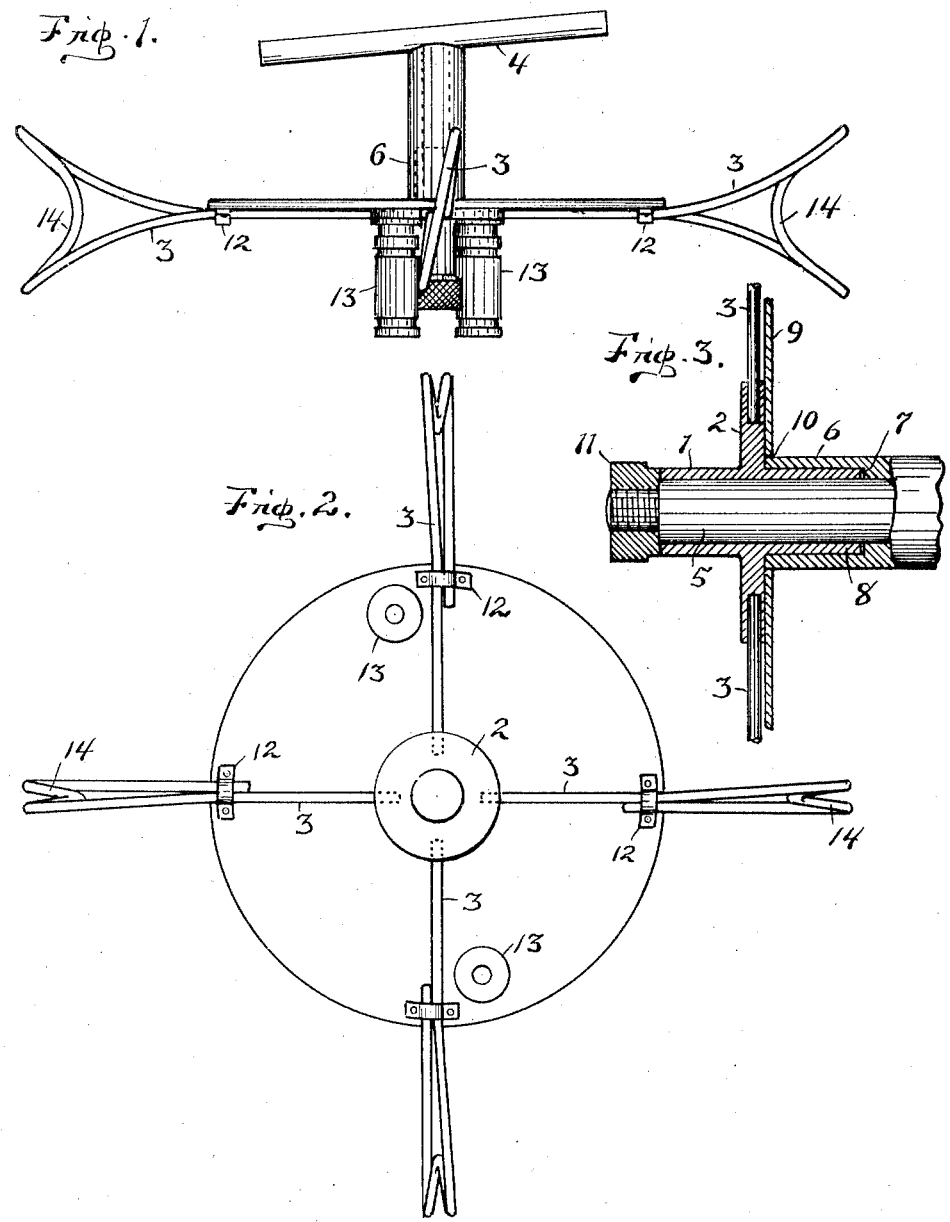

SAMUEL L. KUNTZ, OF FORT WAYNE, INDIANA.

FISH-REEL.

1,334,763.　　　　Specification of Letters Patent.　　Patented Mar. 23, 1920.

Application filed February 10, 1919. Serial No. 275,935.

*To all whom it may concern:*

Be it known that I, SAMUEL L. KUNTZ, a citizen of the United States of America, and resident of Fort Wayne, in the county of Allen and State of Indiana, have invented certain new and useful Improvements in Fish-Reels, of which the following is a specification.

This invention relates to improvements in fish reels and the object thereof is to afford a construction for a fish reel of the windmill type having a thumb-plate and which is provided with a bearing contact with the stud upon which it is mounted so arranged as to insure freedom from wabbling. In using fish reels of this character, especially when "casting" the reel runs at great velocity while the line is running out, and the fisherman regulates the movement of the reel by applying pressure with his thumb against the thumb-plate so as to prevent the reel from over-running and tangling the line. In applying pressure to the thumb-plate in the usual manner to the reel of ordinary construction, the barrel of the reel tends to bind upon the spindle if the latter is closely fitting, and the reel tends to wabble if the spindle is loose enough to admit of free running of the reel. The present invention contemplates a remedy for these objectionable characteristics of reels of ordinary construction.

The object of the invention is accomplished by the construction illustrated in the accompanying drawings in which:—

Figure 1 is a plan view of the reel;

Fig. 2 is an end view of the same projected from Fig. 1; and

Fig. 3 is a detail view upon an enlarged scale showing a central section of the hub of the reel and a portion of the post with which it is connected.

Similar characters of reference indicate corresponding parts throughout the several views and referring now to the same:—

1 is the hub for the reel and has a central flange 2 to which is secured the inner ends of the respective arms 3. 4 is a bracket for the attachment of the reel to the fish pole (not shown). The bracket has a projecting stud 5 and also a concentric projecting barrel 6, there being an annular recess 7 between the inner wall of the barrel 6 and the stud 5. The inner end 8 of the hub and the barrel 6 are so proportioned that the former fits snugly within the latter and receives bearing support therein as well as upon the stud that extends entirely through the hub. A thumb-plate 9 consisting of a circular metallic disk is secured to the inner side of the flange 2, and has a central annular orifice 10 into which extends the outer end of the barrel 6 thus admitting of bearing contact between the end of the barrel and the flange and also affording separate bearing surface between the outside of the barrel and the thumb-plate. A nut 11 has threaded relation at the outer end of the stud 5 and serves to hold the hub in proper position upon the stud so that the flange will bear properly against the end of the barrel.

The arms 3 of the reel may be formed in any suitable manner, those shown being formed of wire and being secured to the thumb-plate respectively by means of cleats 12 and also to the flange of the hub. Handles 13 are also mounted in connection with the thumb-plate for operating the reel. The outer ends 14 of the arms 3 are looped inwardly so as to receive and hold the fish line as the reel is rotated.

In operating the invention, while the reel is spun upon its bearing and while pressure with the thumb is applied to the thumb-plate, the unusual amount of bearing surface, and the location of a portion of the bearing surfaces affording the hub prevent chattering and wabbling.

What I claim is:—

1. In a fish reel bearing, a supporting barrel having a fixed projecting stud, there being an annular recess between the stud and the outer end of the barrel; a rotating member including a hub having a central external flange and thumb-plate attached thereto, there being a central annular orifice in the latter, the hub being supported upon the stud with its inner end extending into the recess and the outer end of the barrel extending into the orifice and bearing against the flange; and means for retaining the hub in operative position on the stud.

2. In a fish reel bearing, a supporting barrel having a fixed projecting stud and an annular recess within one end surrounding the stud; and a rotating member having a hub with an external flange and thumb-plate attached thereto, the latter having a central orifice therein adapted to receive the end of the barrel when the hub is positioned on the stud with the adjacent end thereof extending into the recess of the barrel.

In testimony whereof I affix my signature in presence of two witnesses.

SAMUEL L. KUNTZ.

Witnesses:
 MATILDA METTLER,
 W. G. BURNS.